United States Patent
Agostinelli

(10) Patent No.: US 10,469,849 B2
(45) Date of Patent: Nov. 5, 2019

(54) VIDEO AND IMAGE ENCODING PROCESS

(71) Applicant: TRELLIS EUROPE SRL, Galazzano (SM)

(72) Inventor: Massimiliano Agostinelli, Rome (IT)

(73) Assignee: TRELLIS EUROPE SRL, Galazzano (SM)

( * ) Notice: Subject to any disclaimer, the term of this patent is extended or adjusted under 35 U.S.C. 154(b) by 189 days.

(21) Appl. No.: 15/517,470

(22) PCT Filed: Jun. 16, 2015

(86) PCT No.: PCT/IB2015/054544
§ 371 (c)(1),
(2) Date: Apr. 6, 2017

(87) PCT Pub. No.: WO2016/055875
PCT Pub. Date: Apr. 14, 2016

(65) Prior Publication Data
US 2017/0310981 A1     Oct. 26, 2017

Related U.S. Application Data

(60) Provisional application No. 62/060,774, filed on Oct. 7, 2014.

(51) Int. Cl.
*H04N 7/12*     (2006.01)
*H04N 19/186*   (2014.01)
(Continued)

(52) U.S. Cl.
CPC .......... *H04N 19/186* (2014.11); *H04N 19/117* (2014.11); *H04N 19/187* (2014.11); *H04N 19/33* (2014.11); *H04N 19/85* (2014.11)

(58) Field of Classification Search
CPC ...... H04N 19/33; H04N 19/00; H04N 19/117; H04N 19/186; H04N 19/187; H04N 19/85
(Continued)

(56) References Cited

U.S. PATENT DOCUMENTS

| 8,248,486 B1 * | 8/2012 | Ward ............ H04N 9/67 348/223.1 |
| 8,462,194 B2 | 6/2013 | Salvucci |

(Continued)

FOREIGN PATENT DOCUMENTS

EP     2613532 A1     7/2013

OTHER PUBLICATIONS

F. Drago, et al., Mapping for Displaying High Contrast Scenes, Computer Graphics Forum, vol. 22, No. 3, Sep. 1, 2003 (Sep. 1, 2003), pp. 419-426.

(Continued)

*Primary Examiner* — Gims S Philippe
(74) *Attorney, Agent, or Firm* — Colby Nipper PLLC

(57) ABSTRACT

A method for processing image and video data, comprising providing high dynamic range image data (HDR) and a corresponding low dynamic range image data (LDR). The LDR image is encoded in a legacy code stream, while a residual code stream is generated and encoded containing data necessary for the reconstruction of the HDR image in a decoding phase. To generate the residual code stream, LDR image data are processed so as to obtain a processed LDR* image, then a component data of the HDR image and a corresponding component of the processed LDR* image are selected and residual data of the selected component data are calculated by dividing the component of the processed LDR* image data by the component of the HDR image data. The residual data of the selected component are scaled into the range of values comprised between 0 and 1 and are then encoded in a residual code stream. A decoding method is also disclosed which allows reconstruction of an HDR image from a legacy code stream and a residual data code stream.

21 Claims, 6 Drawing Sheets

(51) Int. Cl.
*H04N 19/117* (2014.01)
*H04N 19/187* (2014.01)
*H04N 19/33* (2014.01)
*H04N 19/85* (2014.01)

(58) Field of Classification Search
USPC ......... 375/240.26, 240.12; 382/162; 345/589
See application file for complete search history.

(56) References Cited

U.S. PATENT DOCUMENTS

| | | | | |
|---|---|---|---|---|
| 8,606,009 B2* | 12/2013 | Sun | ............................ | G06T 5/50 |
| | | | | 382/169 |
| 2009/0046207 A1 | 2/2009 | Salvucci | | |
| 2009/0175338 A1 | 7/2009 | Segall | | |
| 2010/0172411 A1* | 7/2010 | Efremov | .............. | H04N 19/136 |
| | | | | 375/240.12 |
| 2011/0188744 A1* | 8/2011 | Sun | ............................ | G06T 5/50 |
| | | | | 382/162 |
| 2012/0236020 A1* | 9/2012 | Paris | ....................... | G06T 5/009 |
| | | | | 345/589 |

OTHER PUBLICATIONS

Yasir Salih et al, Tone mapping of HDR images: A review, Intelligent and Advanced Systems (ICIAS), 2012 4th International Conference on IEEE, Jun. 12, 2012 (Jun. 12, 2012), pp. 368-373.

Garbas J et al, Inter-layer prediction for backwards compatible high dynamic range video coding with SVC, 2012 Picture Coding Symposium (PCS 2012), Krakow, Poland, May 7-9, 2012, [Proceedings], IEEE, Piscataway, NJ, May 7, 2012 (May 7, 2012), pp. 285-288.

Written Opinion on International Application PCT/IB2015/054544, dated Apr. 14, 2016.

International Search Report on International Application PCT/IB2015/054544, dated Apr. 14, 2016.

* cited by examiner

VIDEO AND IMAGE ENCODING PROCESS

FIELD OF THE INVENTION

This invention relates to improved coding and decoding methods for video and images.

In particular the invention relates to methods, computer programs and apparatuses for encoding and decoding High Dynamic Range video and image data.

BACKGROUND ART

Various methods exist for storing video and images on computer storage such as hard drives, flash drives, CDs, DVDs, BLU-RAY and the like. It is usually desirable to compress the data making up a video or image before storing in order to avoid using too much storage space to store a particular video segment or one or more photographic or their graphic images, particularly if they are high definition or high resolution, which tend to involve more data.

U.S. Pat. No. 8,462,194 discloses a method for processing High Dynamic Range (HDR) images, which provides for generating a Low Dynamic Range (LDR) image by clamping the HDR image. The method, disclosed as "Fifth method" in U.S. Pat. No. 8,462,194, also provides for generating a fractional colour representation (called FC-frame) of the LDR image by dividing each RGB component of the LDR image by a respective RGB component of the original HDR image. Both the LDR image and the FC-frame are separately compressed. In this way a data file transporting the LDR image and the FC-frame can be decoded by a legacy decoder (that will decode only the LDR image), and by a new decoder that, using the FC-frame, will be able to reconstruct the HDR image. U.S. Pat. No. 8,462,194 also discloses scaling and/or gamma to correct the FC-frame; details of these scaling and gamma corrections are not given, e.g. U.S. Pat. No. 8,462,194 discloses that scaling is obtained by multiplying by an "$f$" factor which is not defined.

Although effective, the method known from U.S. Pat. No. 8,462,194 works well only if the LDR image is obtained by clamping the HDR image. If the LDR image is obtained in a different way, the method may not work properly.

BRIEF DESCRIPTION OF THE INVENTION

The present invention has been made in the effort to solve the above-mentioned problems of the prior art encoding and decoding methods.

The present invention provides a method for encoding video and images that allows compression and storage. The present invention also provides a method for decoding to recreate the stored video or image, using existing or legacy decoders, such as but not limited to, JPEG, PNG, MPEG, HEVC, H264, etc.

The invention provides in one embodiment a method for encoding, storing and decoding a high-dynamic range (HDR) video or image, comprising: providing an HDR video or image and its low dynamic range version (LDR); separating the HDR video or image data into a base layer and an HDR residual layer; and encoding the base and HDR residual layers with an encoder. The decoding process is also included.

In one embodiment, the invention provides a method for processing video or image data, comprising providing high dynamic range video or image data (HDR) and low dynamic range video or image data (LDR) of the high dynamic range image data (HDR). The low dynamic range image data is encoded in a first code stream, preferably with a legacy video or image encoder such as JPEG or MPEG. The method also provides for selecting a component of the image data and a corresponding component of the low dynamic range image data, and calculating the residual data of the selected component by dividing the component of the low dynamic range data by the component of the high dynamic range image data. The residual data are then scaled in the range of values comprised between 0 and 1 and encoded in a residual code stream.

Scaling of the residual data in the range 0-1 before encoding, allows the encoding method to work properly independently of the method used for obtaining the LDR image from the HDR image. The LDR image can be obtained by clamping the HDR image or by tone mapping it. In both ways, the provision of scaling allows a better encoding of the residual data for a proper HDR reconstruction in the decoding phase.

In one embodiment, the low dynamic range image data (LDR) is obtained by tone mapping the high dynamic range image data (HDR) and applying a gamma curve to the tone mapped image data in order to obtain suitable backward compatible LDR image data ready for its visualization on LDR displays. In this embodiment, in order to calculate the residual data, the low dynamic range image data is linearized. This means that it is corrected with the inverse of the gamma curve applied to the tone mapped image data.

This solution allows the calculation of the residual data by working with two video frames or images that are expressed in linear space.

Preferably, the encoding method also provides for correcting the scaled residual data by applying a further gamma curve, e.g. a power function, which increases residual data that are too close to zero.

This solution improves encoding since otherwise most of the residual data would fall into the dark side of the dynamic range (values close to zero) and it would be difficult to correctly reconstruct the HDR image.

In another embodiment the low dynamic range image data (LDR) and the high dynamic range image data (HDR) are represented in different colour spaces. In this embodiment, the method further provides for converting the low dynamic range image data in the colour space of the high dynamic range image data for calculating the residual data of the selected component data by dividing the component of the converted low dynamic range image data by the component of the high dynamic range image data.

If a space conversion has been implemented in order to calculate the residual data, then the residual data may or may not be converted in the colour space of the low dynamic range image data before being scaled and gamma corrected.

In one embodiment, the method further provides for exposing the high dynamic range image data before calculating the residual data, and using the exposed high dynamic range image data for calculation of the residual data.

By exposing the high dynamic range image data, encoding of the residual data in the lower part of its dynamic range is improved.

The invention also includes an encoder to encode the LDR and the HDR image respectively in a legacy code stream and in a residual code stream according to the method cited above and better disclosed in the following description.

The invention also includes a decoding method and a decoder adapted to reconstruct the HDR image from the legacy code stream and the residual data stream.

DESCRIPTION OF THE DRAWINGS

Further features and advantages of the invention will be apparent from a review of the following detailed description of the preferred embodiments thereof, taken together with the attached drawings, in which.

DETAILED DESCRIPTION OF THE INVENTION

Figure 1:
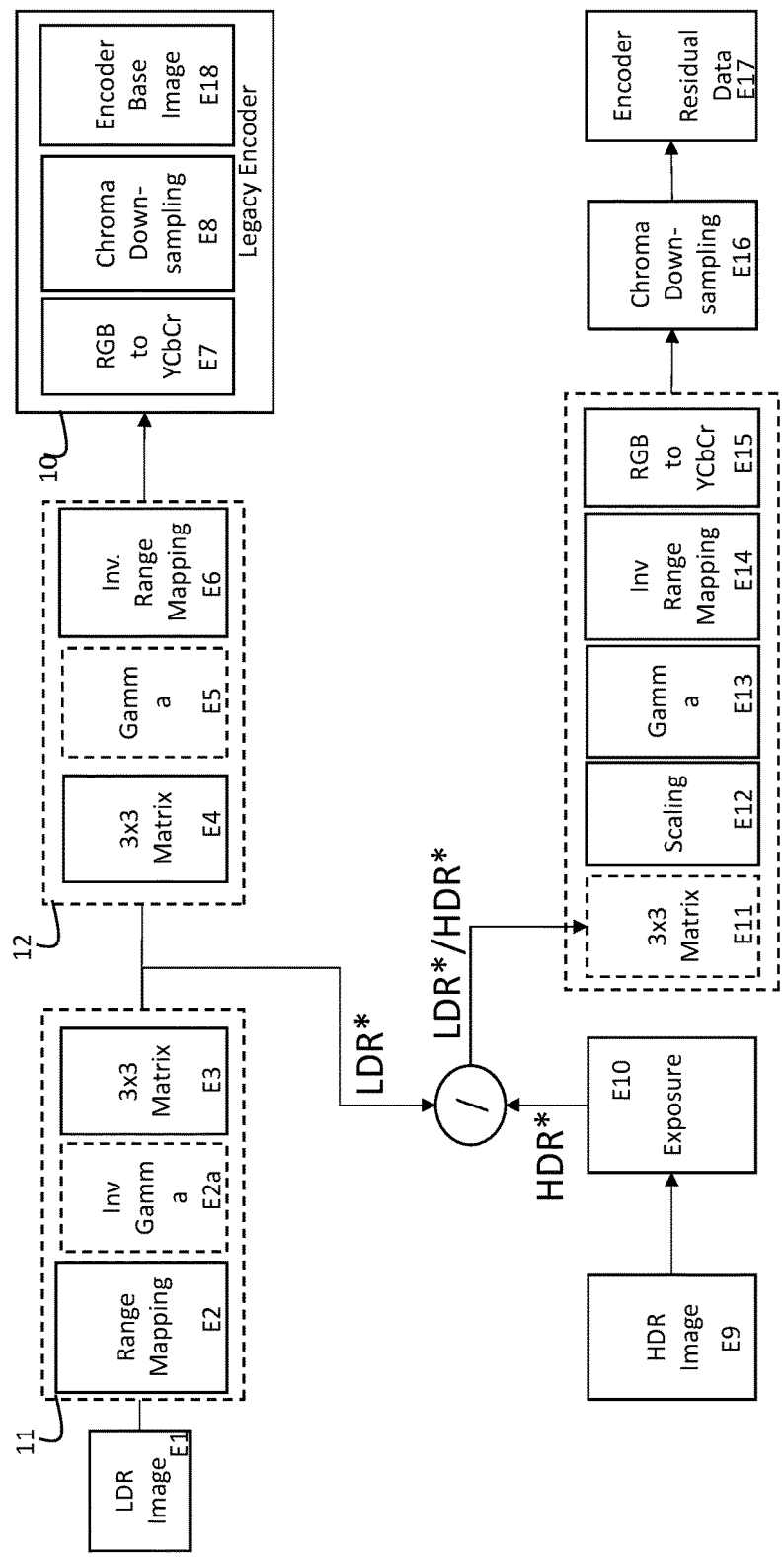
FIG. 1 is a schematic diagram of the encoding process of the present invention.

While the invention is susceptible to various modifications and alternative forms, some preferred embodiments are shown in the drawings and will be described below in detail. It should be understood, however, that there is no intention to limit the invention to the specific embodiment disclosed, but, on the contrary, the intention of the invention is to cover all modifications, alternative forms, and equivalents falling within the scope of the invention as defined in the claims.

The use of "for example", "etc", "or" and "such as" indicates non-exclusive alternatives without limitation unless otherwise defined. The use of "including" means "including, but not limited to," unless otherwise defined.

The term High Dynamic Range (in short, HDR) image will be used to identify an image or image data whose components are represented using more than 8 bits per colour channel.

The term Low Dynamic Range (shortened LDR) image will be used to identify an image or image data whose components are represented using less bits per color channel compared to the corresponding HDR image.

Figure 6:
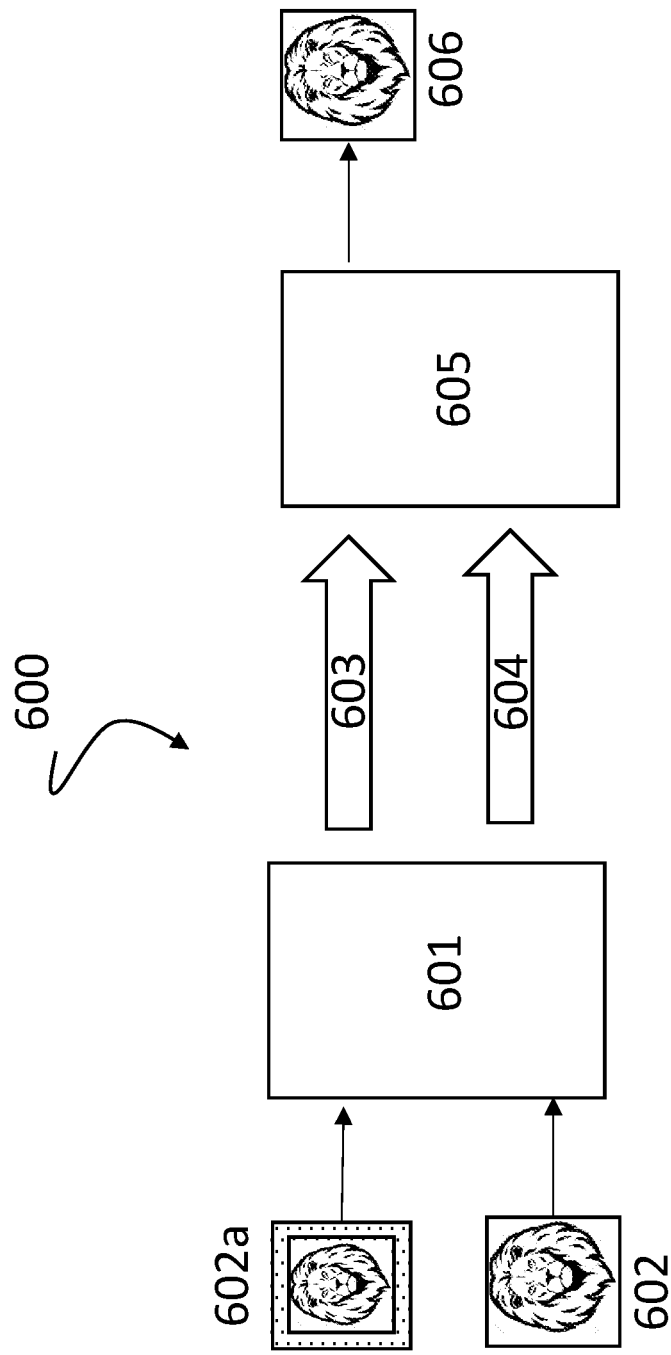
FIG. 6 illustrates a system for processing images.

An image processing system according to the present invention is hereby described with reference to FIG. 6.

The processing system 600 comprises an encoder 601 for encoding an HDR image 602. The encoder 601 receives as input the HDR image 602 and a Low Dynamic Range (LDR) image 602a obtained by tone mapping or exposing and clamping the HDR image 602.

In one embodiment, the encoder 601 is configured to receive as input only the HDR image 602 and to generate the LDR image 602a from the HDR image 602. The encoder 601 processes the HDR and LDR images (602,602a) and outputs a legacy code stream 603 comprising an encoded LDR image (preferably corresponding to the LDR image 602a) and a residual code stream 604 comprising residual data that can be used, in combination with the encoded LDR image, for reconstruction of the HDR image.

In order to process the HDR image into a legacy code stream and a residual code stream, the encoder 601 comprises electronic circuitry for implementing an encoding method as described here below with respect to the non-limiting examples of FIGS. 1 to 3 and 5.

The processing system 600 also comprises a decoder 605 which is configured to implement a decoding process as described in the following description, e.g. with reference to FIG. 4.

Decoder 605 receives as input the legacy code stream 603 and the residual code stream 604 and outputs an HDR image 606 corresponding to the original HDR image 602.

Encoding

The encoding process of the present invention decomposes an HDR image into a base layer and an HDR residual layer. The base layer is a Low Dynamic Range (LDR) image which is either an exposed and clamped version or a tone mapped version derived from the original floating point HDR image.

The LDR image is encoded in a legacy code stream that is the backwards-compatible part of the encoded HDR image, that will be accessible by all legacy decoders. A legacy decoder is an existing standard decoder process such as, but not limited to, JPEG, PNG, MPEG, HEVC, H264 etc. As an example, a legacy decoder can be one complying with ISO/IEC 18477-1 supporting 8 bit extended or baseline, extended or progressive Huffman modes.

The HDR residual layer contains the fractional part of the tone mapped LDR image divided by the original HDR image (after the exposure step E10) carried out channel by channel in RGB space. The HDR residual layer is encoded in a residual data code stream.

The number of components (Nc) signalled in the header of the residual code stream should be identical to the number of components in the legacy code stream. Nc=3 denotes an image with three colour components and Nc=1 denotes a grey image that, for the sake of simplicity, is indicated through the entire document as Y.

The encoding process is depicted in FIG. 1. This process can be applied to images or image data which can be independent images (e.g. pictures) or frames of a video. In the embodiment of FIG. 1, the encoding process takes as input two images: a linear HDR image (block E9) and its LDR counterpart (block E1).

In one embodiment, the LDR image is generated by tone mapping the HDR image, that is the LDR image is obtained by applying a well-known tone mapping algorithm, such as one described in the scientific articles [1]-[4] listed at the end of the present description. Alternatively, the LDR image can be obtained from the HDR image in any other way (e.g. by exposing and clamping the HDR image, or by colour grading and tone adjustment processes), provided that the dynamic range of the LDR image is lower than that of the HDR image.

Although in the embodiment of FIG. 1 the LDR image E1 is taken as input, in one embodiment, generation of the LDR image (by tone mapping or clamping or other method) can be a step of the encoding method, which therefore starts with just an HDR image and then provides for generating the relative LDR image from the input HDR image.

The encoding process provides for encoding the LDR image and residual data that will be necessary for reconstruction of the HDR image by the decoder.

In FIG. 1, the upper path, which comprises blocks from E1 to E18, is the encoding process of the LDR image.

Figure 2:
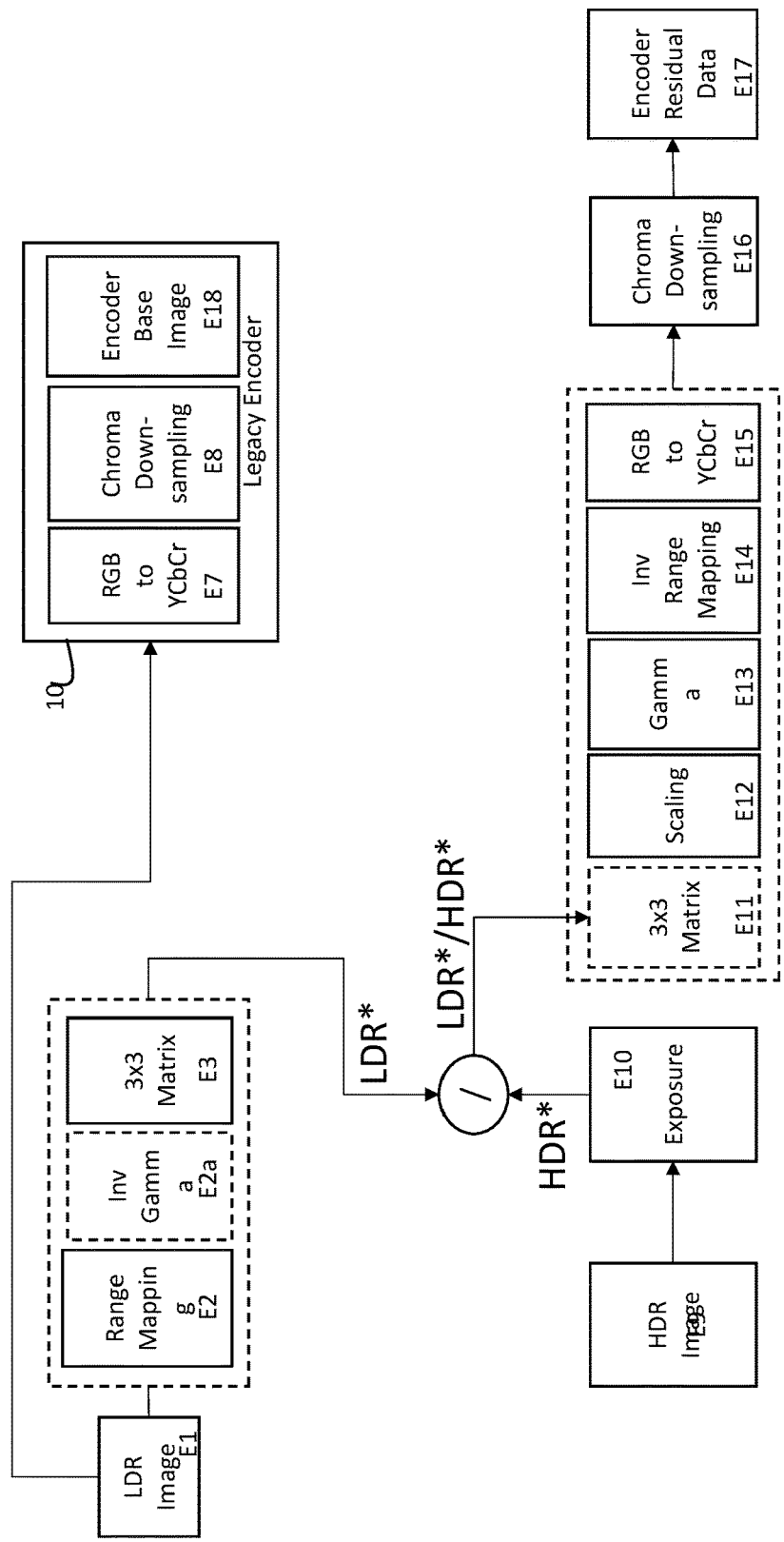
FIG. 2 is a schematic diagram of an encoding process alternative to FIG. 1.

As better explained in the following, in one preferred embodiment processing blocks 11 (comprising blocks E2, E2a and E3) and 12 (comprising blocks E4, E5 and E6) execute inverse operations so that, for the sole purpose of encoding the LDR image, they can be omitted as indicated in FIG. 2, wherein the LDR image is directly passed as input to the legacy encoder 10. Processing block 11 is maintained in FIG. 2 for the purpose of calculating the residual data.

The legacy encoder 10 can be a JPEG, PNG, MPEG, HEVC, H264 or other type of legacy encoder. In the example of FIG. 1, the legacy encoder 10 comprises a process wherein the input RGB image undergoes a colour space conversion from RGB to YCbCr (block E7) and then undergoes chroma downsampling (block E8). After this process, the LDR image is passed as input to a legacy codec (block E18), e.g. a JPEG, PNG, MPEG, HEVC, H264 or other codec. Based on the input image and on the type of legacy codec, the pre-processing step inside the legacy decoder could be different. In the following exemplary embodiment, the LDR image will be indicated as $$\text{Idr\_RGB} = \begin{bmatrix} \text{Idr\_R} \\ \text{Idr\_G} \\ \text{Idr\_B} \end{bmatrix}$$

if Nc=3 or as ldr_Y in the case of a grey scale image (Nc=1). ldr_RGB is therefore an image comprising three colour components: ldr_R (red), ldr_G (green) and ldr_B (blue).

Coming back to FIG. 1, the LDR image is a not compressed image, e.g. a .png, .ppm or .bmp image, represented via 8 bit channels, which means that each component (e.g. Red, Green and Blue or the Luminance component Y) can be represented with values ranging from 0 to 255.

Block E2 converts the RGB tone mapped image ldr_RGB (or ldr_Y if Nc=1) to float [0,1], which means dividing each component by 255. The output of block E2 is therefore $$\text{base\_Idr\_RGB} = \begin{bmatrix} \text{base\_R} \\ \text{base\_G} \\ \text{base\_B} \end{bmatrix} = \frac{1}{255} \cdot \begin{bmatrix} \text{Idr\_R} \\ \text{Idr\_G} \\ \text{Idr\_B} \end{bmatrix} \text{ if } Nc = 3, \text{ or} \quad (1a)$$

$$\text{base\_Y} = \frac{1}{255} \cdot \text{Idr\_Y if } Nc = 1. \quad (1b)$$

This can be obtained with the following code:

```
if (Nc == 1) {
    base_Y = ldr_Y / 255.0;
} else if (Nc == 3) {
    base_R = ldr_R/255.0;
    base_G = ldr_G/255.0;
    base_B = ldr_B/255.0;
}
```

Other range mapping methods can be used.

Block E2a is optional and it is used when the input LDR image is not linear. In this case it is necessary to linearize the LDR image signal. This is performed through a gamma operation, i.e., for example, but not limited to, a simple power function or an sRGB gamma or using a Look-Up Table. The gamma curve must be the inverse of the gamma curve applied during the process for generation of the LDR image. As an example, if the LDR image is obtained applying a tone mapping algorithm to the HDR image and if the tone mapping algorithm applies a non linear gamma curve, e.g. $\Gamma=x^{1/2.2}$ with x being the R, G or B component and 1/2.2 being the gamma correction, than block E2a applies the inverse gamma curve $\Gamma^{-1}=x^{2.2}$ to each component.

Block E3 is used to convert the LDR image to the colour space of the HDR image. It includes a 3×3 matrix that converts the smaller colour space of the LDR input image into the wider colour space of the HDR input image.

From a mathematical point of view, space conversion is therefore represented by the following formula:

$$\text{wide\_ldr\_RGB} = H \cdot \text{base\_ldr\_RGB for } Nc=3 \quad (2)$$

wherein $$H = \begin{bmatrix} a\_1 & a\_2 & a\_3 \\ a\_6 & a\_5 & a\_6 \\ a\_7 & a\_8 & a\_9 \end{bmatrix}$$

is the space conversion matrix.

This can be obtained with the following code:

```
if ( Nc == 1) {
    wide_Y = base_Y;
} else if (Nc == 3) {
    wide_R = a_1 * base_R + a_2 * base_G + a_3*base_B;
    wide_G = a_4 * base_R + a_5 * base_G + a_6*base_B;
    wide_B = a_7 * base_R + a_8 * base_G + a_9*base_B;
}
``` where the coefficients a_i (a_1 to a_9) are the matrix elements for the colour space conversion.

This step E3 is required if and only if the two input images (LDR and HDR) are represented in two different colour spaces, i.e. by way of example but not limited to, the LDR image is represented in an sRGB colour space and the HDR image is represented in an XYZ colour space. Other colour spaces can be used to represent the input HDR images such as, but not limited to, BT 2020, BT 709 etc.

If both images are represented under the same colour space, this matrix is an identity matrix or step E3 is skipped.

The residual data (in the following indicated by the matrix res_Y in case Nc=1 or res_RGB if Nc=3) is obtained by dividing the output of block E3 (LDR*) by the output of block E10 (HDR*). The output of block E10 (exp_Y in case Nc=1 or exp_RGB if Nc=3) is the input HDR image after an exposure step. Residual data are therefore organized as a residual image having the same number of components as the HDR and the LDR image. The values of each component of the residual image are obtained by dividing the values of an LDR image component by the respective values of the corresponding HDR image component. Using the above notation, the following formula applies.

$$\text{Res\_RGB} = \text{wide\_ldr\_RGB}/\text{exp\_RGB for } Nc=3 \quad (3a)$$

$$\text{Res\_Y} = \text{wide\_ldr\_Y}/\text{exp\_Y for } Nc=1 \quad (3b)$$

Residual data can be obtained via the following code:

```
if ( Nc == 1) {
    res_Y = wide_Y/exp_Y;
} else if (Nc == 3) {
    res_R = wide_R/exp_R;
    res_G = wide_G/exp_G;
    res_B = wide_B/exp_B;
}
```

The exposure to be applied on the input HDR image is computed on the basis of the input HDR image information; in particular, in block E10 each component of the input HDR image is multiplied by a scalar value "exposure" calculated according to the following formula:

$$\text{exposure} = \frac{\text{scale\_factor}}{\text{out\_average}} \quad (4)$$

wherein out_average is the average value of all the pixels of the input HDR image and scale_factor defines the magnitude of the exposure and it is computed according to the following formula:

$$\text{scale\_factor} = \log_{10} \frac{\text{HDR\_max}}{(\text{HDR\_min} + 10^{-6})} \quad (5)$$

HDR_max and HDR_min are the maximum and minimum values of the input HDR image. If, from a software point of view, the operation (2) results in an undetermined value (e.g. a Not-A-Number value in Mathlab syntax), then scale_factor is taken to 1. Preferably the maximum value of "exposure" is set to 8, therefore if the result of formula (4) is a value bigger than 8, "exposure" is set to 8.

In one embodiment, the method further provides to set to 1 the value of the residual data if a pixel value of the LDR* image is equal to zero or if a value of the HDR* image is equal to or less than 0.

Negative values of the colour pixels of the input HDR image, could be due to a colour space that is not good to correctly represent all the HDR image pixel values, or to other phenomena linked to the camera taking the HDR image. In any case, putting the residuals equal to 1 allows a better reconstruction of the HDR image in the decoding phase.

In another embodiment, if the HDR image comprises pixels having colour values ≤0, the method provides for a further space conversion of the HDR image into a larger colour space wherein the HDR image has all values bigger or equals than 0. If the two input images (LDR and HDR) are represented with two different colour spaces, in one embodiment residual data are calculated in the colour space of the p LDR image.

With reference to FIG. 1, since block E3 has been used to convert the LDR image in the colour space of the HDR image, the residual data are calculated in the colour space of the HDR image, therefore block E11 is used to convert the residual data to the colour space of the LDR image and of the legacy encoder 10.

The output of block E11 therefore is $$\text{res\_RGB}' = \text{res\_RGB} \cdot H^{-1} \text{ for } Nc=3 \quad (6a)$$

$$\text{res\_Y}' = \text{res\_Y} \text{ for } Nc=1 \quad (6b)$$

The optional use of this block may slightly influence the quality performance of the compression process.

Block E11 can be implemented via the following code:

```
if ( Nc == 1) {
    res_Y' = res_Y;
} else if (Nc == 3) {
    res_R' = inva_1 * res _R + inva_2 * res _G + inva_3* res _B;
    res_G' = inva_4 * res _R + inva_5 * res _G + inva_6* res _B;
    res_B' = inva_7 * res _R + inva_8 * res _G + inva_9* res _B;
}
``` wherein coefficients inva_i are the matrix element $H^{-1}$ which is the inverse of matrix H used in block E3. If this block is not used, either an identity 3×3 matrix is used or this step is skipped. In the latter case the input to Block E11 is res_RGB if Nc=3 or res_Y if Nc=1.

The output of block E11 is scaled between the range [0,1] through block E12. The output of block E12 therefore are residual data (scaled_res_RGB for Nc=3, scaled_res_Y for Nc=1) having values ranging from 0 to 1.

Scaling of the residual data in the range [0,1] can be obtained by subtracting from each component the minimum value of that component and by dividing the result of the subtraction by the difference between the maximum and the minimum values of the component, e.g.

$$\text{scaled\_}Y' = (\text{res\_}Y' - \min Y')/(\max Y' - \min Y') \quad (7)$$

An example of scaling can be implemented via the following code:

```
if (Nc == 1){
    scaled_Y = (res_Y' - minY')/(maxY' - minY');
}else if (Nc == 3) {
    scaled_R = (res_R' - minR')/(maxR' - minR');
    scaled_G = (res_G' - minG')/(maxG' - minG');
    scaled_B = (res_B' - minB')/(maxB' - minB');
}
``` wherein scaled_R, scaled_G and scaled_B are the components of scaled_res_RGB, scaled_Y is the component of scaled_res_Y, and wherein maxRGB' and minRGB' are the maximum and minimum R, G, and B values of the res_RGB' image. If Nc=1, maxY' and minY' are the maximum and minimum of the res_Y' image. Other types of scaling can be used.

After the residual data have been scaled in block E12, a gamma correction is applied in the following block E13.

Block E13 describes a gamma operation to better distribute the residual data between 0 and 1 and to prevent smaller values closer to zero from being quantized to zero during the encoding.

In one embodiment, in block E13 each component of the input scaled residual data is multiplied by a power function according to the following formula:

$$\text{gamma\_res}_i = (\text{scaled}_i)^{\frac{1}{hdr\_gamma}} \quad (8)$$

Wherein $\text{gamma\_res}_i$ is the output component of the residual data image gamma_res_Y (if Nc=1) or gamma_res_RGB (if Nc=3), wherein $\text{scaled}_i$ indicates a component of the scaled residual data output by block E12 and wherein hdr_gamma is preferably bigger than 1, so that when calculating the value $$\text{scaled\_B}^{\frac{1}{hdr\_gamma}}$$

lower values are increased.

In one embodiment, hdr_gamma is calculated according to the following formula $$\text{hdr\_gamma} = \frac{\log(\text{min\_value})}{\log(0,5)} \quad (9)$$

wherein $$\text{min\_value} = \frac{1}{\text{max\_HDR}} \quad (10)$$

wherein max_HDR is the maximum pixel value of the input HDR image. The output of block E13 (gamma_res_Y for Nc=1, gamma_res_RGB for NC=3) can be obtained through the following code:

```
if (Nc == 1) {
    gamma_Y = power(scaled_Y, 1.0/hdr_gamma);
} else If (Nc == 3) {
    gamma_R = power(scaled_R, 1.0/ hdr_gamma);
    gamma_G = power(scaled_G, 1.0/ hdr_gamma);
    gamma_B = power(scaled_B, 1.0/ hdr_gamma);
}
``` wherein gamma_R, gamma_G and gamma_B are the components of gamma_res_RGB, gamma_Y is the component of gamma_res_Y, power (x,y) is a function outputting the value of $x^y$, and wherein hdr_gamma is computed based on the information contained in the input HDR image, e.g. according to formula (10).

Block E14 converts the float [0,1] residual data to [0,255], e.g. by multiplying the floating values by 255 and then rounding to integer. It is exactly the inverse of Block E2 and can be obtained via the following code:

```
if (Nc==1) {
    int_Y=gamma_Y * 255.0;
} else if (Nc==3) {
    int_R=gamma_R * 255.0;
    int_G=gamma_G * 255.0;
    int_B=gamma_B * 255.0;
}
``` wherein int_B, int_G, int_R, int_Y comprise integer values. Also in this case, different inverse range mapping can be used. Preferably the inverse range mapping of block E14 is the inverse of the range mapping applied in block E2. After block E14, the residual data are processed in blocks E15 and E16 which put the data in the format requested by the encoder block E17, which can be either a legacy encoder, e.g. a JPEG codec, or a non legacy encoder.

In the example of FIG. 1, the codec used in block E17 is the same as that used in block E18 in order to save memory and simplify the encoding process. In the following, the output of block E17 is named "residual code stream" to indicate that it contains the residual data (or "residual image") necessary to reconstruct the HDR image.

Block E15 performs a colour space conversion from the colour space of the residual data to YCbCr as specified in the legacy encoder. Its output is either one value rc_Y if Nc=1 or three values rc_R, rc_G, rc_B if Nc=3.

Block E16 performs chroma downsampling as specified in the legacy encoder E17, on the data rc_Y if Nc=1 or on the data rc_R rc_G rc_B if Nc=3. Its output is either one value rd_Y if Nc=1 or three values rd_R,rd_G,rd_B if Nc=3. Finally, the output of block E16 is compressed using the codec in block E17, giving in output the residual encoded data.

As said above, the LDR base image is encoded using a legacy encoder 10.

Since in the embodiment of FIG. 1 the LDR image has been processed in block processing block 11, in order to output the legacy code stream, it is necessary to get back from LDR* to LDR. The encoded tone mapped backward compatible image LDR is therefore obtained from LDR* following the steps designed from block E4 to block E18.

Figure 3:
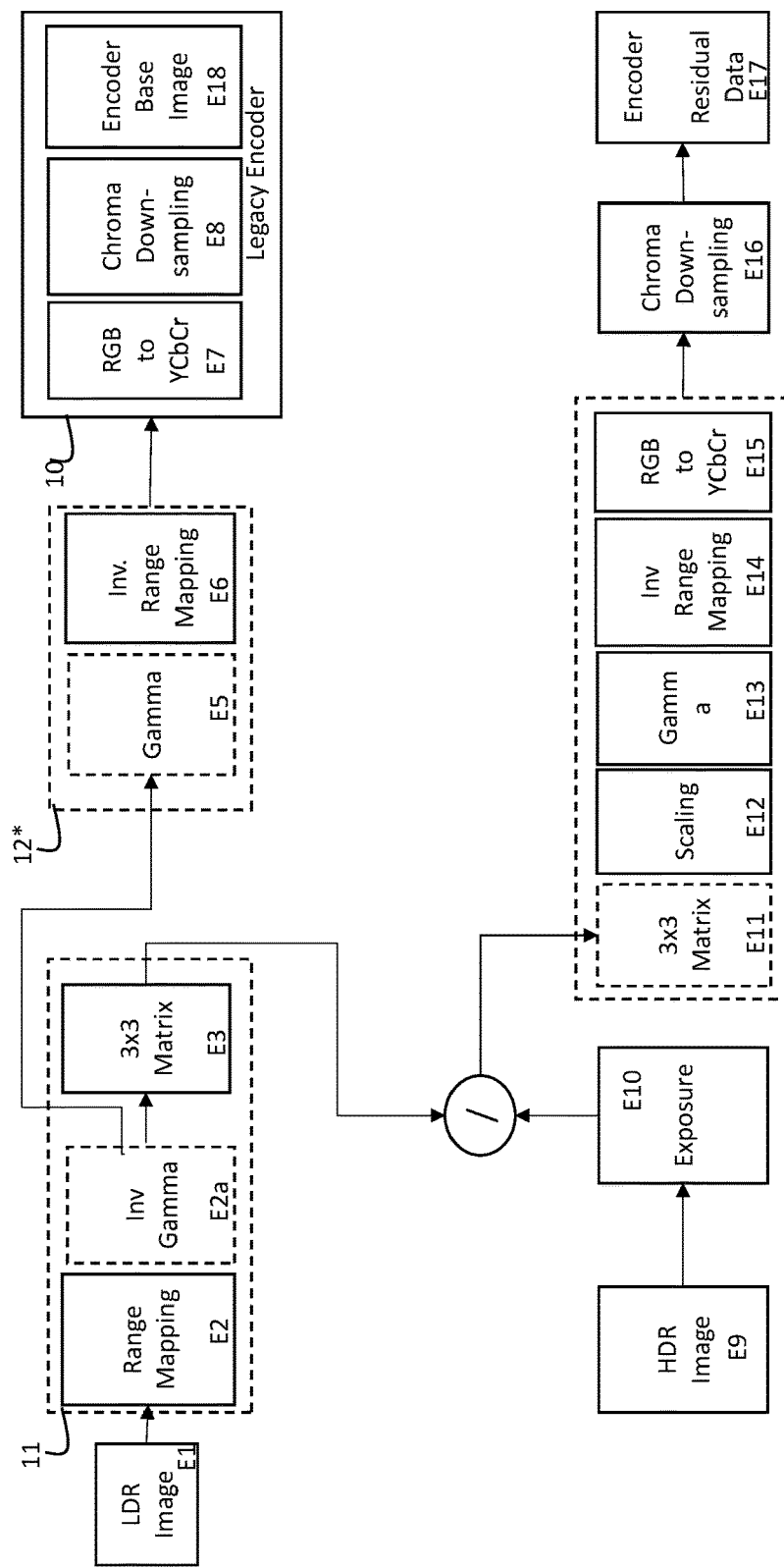
FIG. 3 is a schematic diagram of the encoding process of FIG. 1, with Block E4 eliminated.

Block E4 exists if block E3 exists. Its scope is to re-convert the Tone Mapped (LDR) image into its original colour space, i.e. by way of non-limiting example, if LDR* is in the XYZ colour space and LDR in RGB, E3 converts from XYZ to RGB. Block E4 can be skipped if the scheme of FIG. 3 is used. In this case, we give as input to Block E5 directly the Tone Mapped (LDR) input image after blocks E2 and E2a as shown in FIG. 3.

The output of block E4 is therefore the image $$linbase\_RGB = LDR^* \cdot H^{-1} \text{ if } Nc=3, \text{ or}$$

$$linbase\_Y = LDR^* \text{ if } Nc=1, \text{ or}$$

wherin $H^{-1}$ is the inverse of the colour space conversion matrix H used in block E3. The linbase_RGB or linbase_Y image can be obtained via the following code:

```
if ( Nc == 1) {
    linbase_Y = wide_Y;
} else if (Nc == 3) {
    linbase_R = inva_1 * wide_R + inva_2 * wide _G + inva_3* wide _B;
    linbase_G = inva_4 * wide _R + inva_5 * wide _G + inva_6* wide _B;
    linbase_B = inva_7 * wide _R + inva_8 * wide _G + inva_9* wide _B;
}
``` the 3×3 matrix used is the inverse matrix $H^{-1}$ used in block E11 with coefficients inva_i.

Block E5 performs gamma operation on the LDR image. This operation is only for visualization purposes for the LDR image signal. In the preferred embodiment, block E5 performs the inverse operation of block E2a. The output of block E5 is then converted from float [0,1] to integer [0,255]. This operation (Block E6) is the inverse of block E2.

The final steps of block E7 and E8 are identical to the one of block E15 and E16 but applied on the output of block E6. Finally the output of Block E8 is encoded in block E18 with the legacy codec, giving in output the encoded backward compatible LDR image (tone mapped).

In order to allow a correct reconstruction of the HDR image, according to an embodiment of the present invention, the legacy code stream comprises the following metadata:
  the hdr_gamma value used and the type of gamma curve used for the gamma correction of the residual data of block E13,
  the minRGB and maxRGB (or minY and maxY if Nc=1) used for scaling of the residual data,
  data representative of a space conversion used in the encoding (i.e. data indicating if blocks E3 and E11 are used)
  the exposure parameter "param_expval"
  a parameter "ε" to be used for reconstruction of the HDR image; this parameter is preferably set to $10^{-7}$,
  the ldr_gamma value and the type of gamma curve used for the inverse LDR gamma correction in block E2a.

Decoding

The decoding process combines data in the legacy code stream (containing the base image, LDR) and in the Residual code stream to recover the HDR image. The details of this merging process are outlined below with reference to the decoding of an image which can be a frame of a video or a simple picture.

Figure 4:
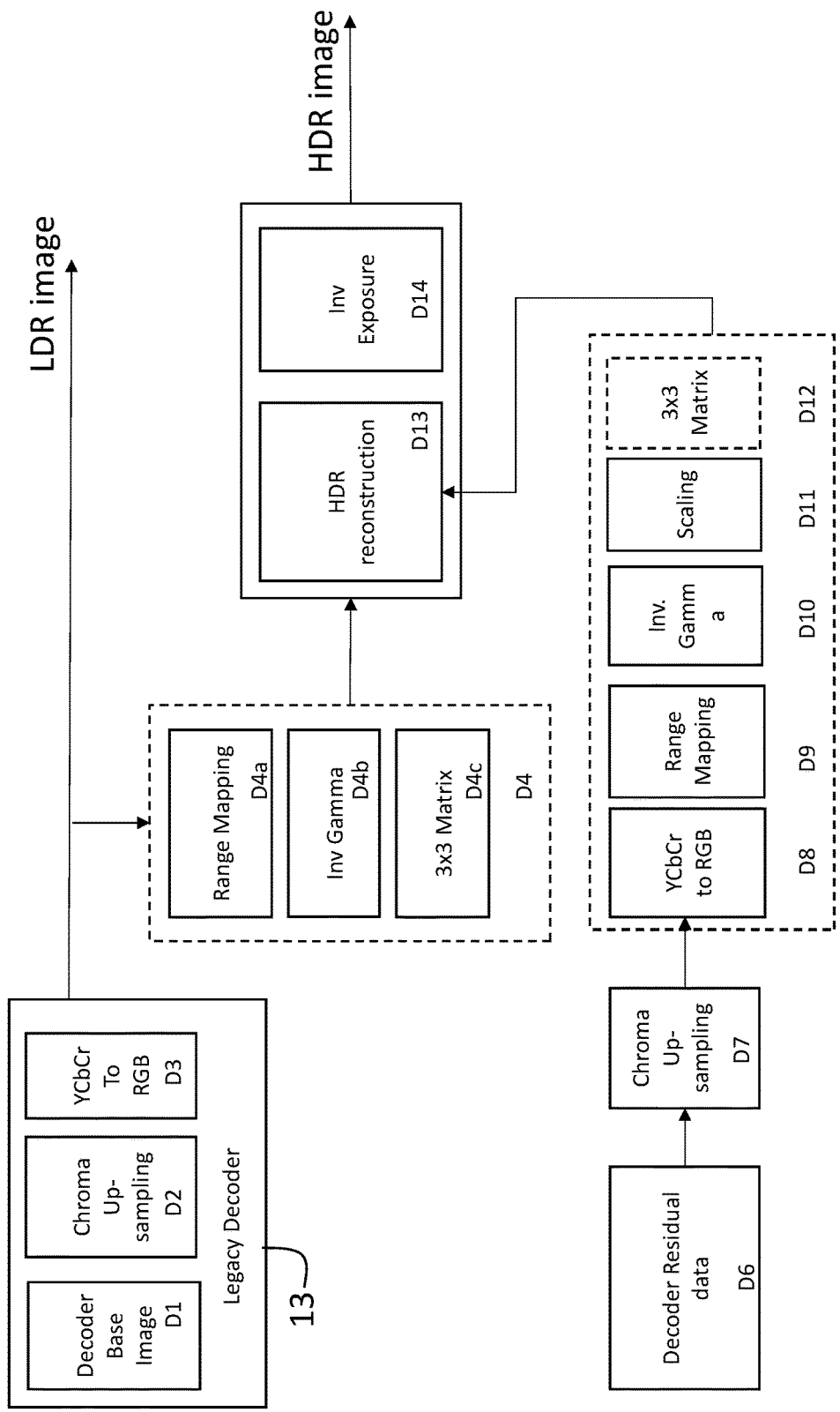
FIG. 4 is a schematic diagram of another embodiment of the decoding process of the present invention.
Figure 5:
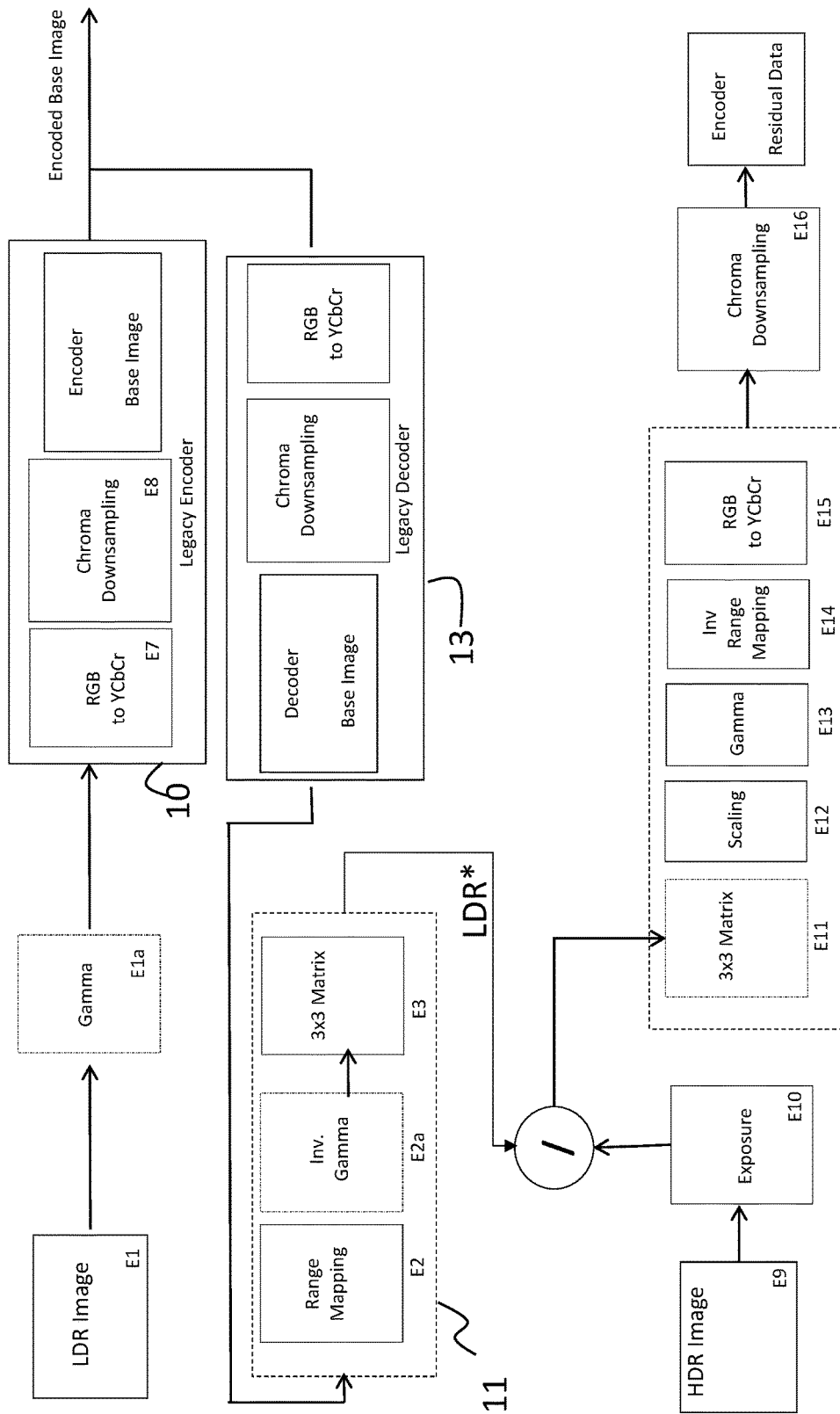
FIG. 5 is a schematic diagram of an encoding process alternative to FIG. 1.

In FIG. 4 the upper path that comprises blocks D1, D2, D3 is a standard flow of a legacy decoder that receives as input the legacy code stream and outputs a backwards-compatible LDR image in a specific colour space, i.e. the sRGB colour space in the embodiment of FIG. 4.

The data is then processed by block D4 where a mapping to float (block D4a) is performed followed by an Inverse Gamma operation (block D4b) and optionally a space conversion (block D4c). Block D4 therefore maps the base image into linear floating point space and outputs Linear Pre RGB values.

The number of components Nc of the residual image shall be equal to the number of components signalled in the legacy image.

In the same way as described for block E2, range mapping to float [0,1] can be obtained by dividing each pixel value of the LDR image by 255. This can be implemented by the following code:

```
If (Nc == 1) {
    linbase_Y = Y / 255.0;
} else if (Nc == 3) {
    linbase_R = R/255.0;
    linbase_G = G/255.0;
    linbase_B = B/255.0;
}
```

Other types of scaling can be used.

In order to linearize the floating point image output by block D4a, in block D4b an inverse gamma correction is applied to the output of block D4a. The inverse gamma correction applied in block D4b is the inverse of block E5. The output of block D4b provides either one value LP_Y if Nc==1 or three values LP_R, LP_G, LP_B if Nc==3.

If block E3 exists in the encoding, the LDR stream before being processed in block D13 is multiplied by a 3×3 matrix (block D4c) that describes a colour space transformation. The coefficients of this matrix are the same used in encoding step E3. Therefore a code for implementing block D4c can be the following:

```
If ( Nc == 1) {
    LP_Y' = LP_Y;
} else if (Nc == 3) {
    LP_R' = a_1 * LP_R + a_2 * LP _G + a_3* LP _B;
    LP_G' = a_4 * LP _R + a_5 * LP _G + a_6* LP _B;
    LP_B' = a_7 * LP _R + a_8 * LP _G + a_9* LP _B;
}
```

If block E3 in encoding does not exist, this 3×3 matrix is an identity matrix or this step is omitted in decoding.

In FIG. 4 the lower path starting from D6 relates to processing of the residual data.

In block D6, data of the Residual code stream generated by block E17 are processed by a standard codec (e.g. MPEG or JPEG or H264 etc . . . ) that decodes them. After being decoded, the Residual data undergo a chroma upsampling step in block D7. Chroma upsampling is identical to the upsampling process implemented in the legacy decoder (block D2).

Block D8 then performs a YCbCr conversion to the colour space of the residual data as specified in the legacy decoder (block D3), in the embodiment of FIG. 4 residual data are converted into RGB. Its output provides either one value rc_Y if Nc==1 or three values rc_R, rc_G, rc_B if Nc==3.

Block D9 maps to floating point [0,1] the RGB output of block D8. The operation carried out by block D9 is equivalent to the Range Mapping operation implemented in block D4. The output of block D9 provides either one value rs_Y if Nc==1 or three values rs_R, rs_G, rs_B if Nc==3.

The output of block D9 undergoes an inverse gamma function in block D10. Block D10 applies to the output of block D9 a gamma function that is the inverse of the gamma function used in block E13 during encoding.

With reference to the power gamma function of block E13, the inverse gamma function implemented by block D9 can be implemented via the following code:

```
if (Nc == 1) {
    rcig_Y = power(rs_Y, param_hdr_gamma);
} else if (Nc == 3) {
    rcig_R = power(rs_R, param_hdr_gamma);
    rcig_G = power(rs_G, param_hdr_gamma);
    rcig_B = power(rs_B, param_hdr_gamma);
}
```

The parameter param_hdr_gamma is the same one used in encoding and stored in the metadata (hdr_gamma) of the residual code stream.

The purpose of block D11 is to re-expand the values to recover the original residual image. Block D11 therefore implements the inverse function of block E12. The function implemented by block D11 can be implemented via the following code:

```
if (Nc == 1){
    scaled_Y = rcig_Y * (maxY- minY) +minY;
}
else if (Nc == 3) {
    scaled_R = rcig_R * (maxR- minR) +minR;
    scaled_G = rcig_G * (maxG- minG) +minG;
    scaled_B = rcif_B * (maxB- minB) +minB;
}
``` where the minRGB and maxRGB (or minY and maxY if Nc=1) are stored in the metadata and are the same parameters used in encoding block E12. Other types of scaling can be used.

Block D12 is optional and it is performed only if block E11 in encoding is performed. Here a colour matrix transformation to support wide colour gamut also for residual data is applied. If this operation has not been performed in encoding it will be skipped. This matrix converts the standard colour space of the encoding process to the original colour space of the HDR input image.

With reference to the encoding example described above, wherein a space conversion has been implemented in block E11 using a space colour conversion matrix $H^{-1}$, the linear residual image at the output of block D12 is LR_RGB=scaled_RGB·H for Nc=3

LR_Y=scaled_Y for Nc=1

In one embodiment, block D12 can be implemented via the following code:

```
if ( Nc == 1) {
    LR_Y = scaled_Y;
}
else if (Nc == 3) {
    LR_R = a_1 * scaled_R + a_2 * scaled _G + a_3* scaled_B;
    LR_G = a_4 * scaled _R + a_5 * scaled _G + a_6* scaled _B;
    LR_B = a_7 * scaled _R + a_8 * scaled _G + a_9* scaled _B;
}
```

The 3×3 H matrix of block D12 is the inverse matrix of the one ($H^{-1}$) used in the encoding process in block E11.

After the LDR Base Image and the Residual image have been processed by blocks D4-D12, HDR reconstruction is implemented in blocks D13 and D14. Both D13 and D14 are Divisions.

Block D13 takes the Linear Pre RGB and divides it by the Linear Residual RGB giving the original HDR in floating point. In the preferred embodiment, a small value ε is added to the denominator to avoid a division by zero.

Block D14 implements an inverse exposure to the output of block D13 so as to reconstruct the values to the original exposure.

In one embodiment, block D13 is implemented via the following code:

```
//Block D13
if (Nc == 1) {
    preExp_Y = LP_Y'/(LR_Y + ε);
}else if (Nc == 3) {
    preExp_R = LP_R'/ (LR_R + ε);
    preExp_G = LP_G'/(LR_G + ε);
    preExp_B = LP_B'/(LR_B + ε);
}
```

The value of ε is taken from the residual code stream metadata.

In one embodiment, block D14 is implemented via the following code:

```
//Block D14:
if (Nc == 1) {
    HDR_Y = preExp_Y / param_expval;
}else if (Nc == 3) {
    HDR_R = preExp_R / param_expval;
    HDR_G = preExp_G / param_expval;
    HDR_B = preExp_B / param_expval;
}
```

Wherein param_expval is the exposure value used in the encoding step E10 and contained in the metadata of the residual code stream.

The division of block D13 can be a subtraction followed by an exponential operation if the output of the blocks D4 and D12 are expressed in logarithmic scale. In this case the corresponding code can be the following:

```
if (Nc == 1) {
    preExp_Y = exponential(log(LP_Y'+ ε) – log(LR_Y + ε));
}else if (Nc == 3) {
    preExp_R = exponential(log(LP_R'+ ε) – log(LR_R + ε));
    preExp_G = exponential(log(LP_G'+ ε)–log(LR_G + ε));
    preExp_B = exponential(log(LP_B'+ ε)–log(LR_B + ε));
}
```

The value ε is added to avoid the operation of logarithm of 0.

The function of block D14 is to remove the exposure factor applied in block E10 of the encoding process. The output of block D13 is therefore divided by the "exposure" factor used in encoding. The function of block D14 can be a multiplication if the exposure values stored in the metadata (param_expval) of the residual code stream are equal to the inverse of "exposure", i.e. param_expval is equal to 1.0/exposure. In this case the function of block D14 can be implemented via the following code:

```
if (Nc == 1) {
    HDR_Y = preExp_Y * param_expval;
} else if (Nc == 3) {
    HDR_R = preExp_R * param_expval;
    HDR_G = preExp_G * param_expval;
    HDR_B = preExp_B * param_expval;
}
``` where exposure is the exposure value calculated in encoding and used for block E10.

The param_expval is always greater than zero.

The output of block D14 is the final HDR floating point output.

Alternative Embodiments

It is therefore clear from the above described preferred but not limitative embodiments, that the invention allows an efficient encoding and decoding of HDR images and videos.

The present invention provides several advantageous features. It allows encoding of HDR images providing backward compatibility with legacy encoders without requiring high computational complexity. HDR images can be correctly reconstructed independently from the type of tone mapping used to obtain the backward compatible LDR image from the HDR one.

Although the invention has been described with reference to certain specific embodiments, the description shall not be construed in a limitative way. Several modifications to the described embodiments, as well as alternative embodiments, can be implemented by the person skilled in the art having read the present description. It should be realized by the person skilled in the art that the idea and the specific embodiment disclosed may be slightly modified or used as basis for modifying or designing other structures. The division into logical blocks shall not be construed as limitative, as logical blocks may be differently grouped or organized.

Examples of alternative solutions may be in the way of obtaining the linearized LDR image (LDR*) to be used for the calculation of the residual data. As an example, in FIG. 5, the input of processing block 11 is not obtained directly from block E1 as in FIGS. 1-3. The input LDR image (block E1) is encoded in a legacy encoder 10 as described above with reference to FIG. 2 and then decoded in a legacy decoder 13 in order to obtain the input of processing block 11.

Although this solution requires additional computational costs for decoding (block 13) the encoded LDR image, this solution improves encoding performance because the residual data are calculated starting from the encoded LDR image.

Additionally, it should be noted that in block E14 there is an inverse range mapping operation mapping the pixel values from float [0,1] to [0,255] because in the above examples the residual data are converted in an RGB stream. Nevertheless, the residual data could be encoded with a non-legacy encoder, e.g. a 12-bit JPEG or a JPEG lossless encoder. More in general, therefore, block E14 shall map the pixel values from [0,1] to [0, $2^N-1$], with N being the number of bits used to code each colour component. The same applies to block D9 wherein the residual code stream is decoded.

In the above described embodiment, the LDR image is an RGB image, therefore in block E2 the pixel values of each colour component are divided by 255. It is now clear that if the input LDR image uses more or less than 8 bits per colour component, then block E2 obtains the required range mapping to the values [0,1] by dividing the input pixel values of each component by $2^N-1$, with N being the number of bits used to code each colour component.

In the above described embodiment the legacy encoder 10 requires as input an RGB image/video and therefore in block E6 input pixel values are multiplied by 255. If the legacy encoder 10 is a 10-bit MPEG encoder, then in block E6 pixel values shall be multiplied by $2^N-1$, with N being the number of bits used to code each colour component.

The inverse mapping, from [0, $2^N-1$] to [0,1], applies to block D4a and D9 wherein the first and residual code streams are decoded respectively.

Citations

[1]. F. Drago, K. Myszkowski, T. Annen, and N. Chiba, "Adaptive Logarithmic Mapping For Displaying High Contrast Scenes," Computer Graphics Forum, vol. 22, no. 3, pp. 419-426, September 2003.

[2]. E. Reinhard, M. Stark, P. Shirley, and J. Ferwerda, "Photographic tone reproduction for digital images," ACM Trans. on Graph., vol. 21, no. 3, p. 267, July 2002.

[3]. Z. Mai, H. Mansour, R. Mantiuk, P. Nasiopoulos, R. Ward, and W. Heidrich, "Optimizing a tone curve for backward-compatible high dynamic range image and video compression," IEEE Trans. Image Processing, vol. 20, no. 6, pp. 1558-1571, June 2011.

[4]. R. Mantiuk, K. Myszkowski, and H. Seidel, "A perceptual framework for contrast processing of high dynamic range images," ACM Trans. Applied Perception, vol. 3, no. 3, pp. 286-308, July 2006.

The invention claimed is:

1. A method for processing image data, comprising:
providing high dynamic range image data;
providing low dynamic range image data of the high dynamic range image data;
encoding the low dynamic range image data in a first code stream;
processing the low dynamic range image data so as to obtain a processed image;
selecting a component of the high dynamic range image data and a corresponding component of the processed low dynamic range image data;
calculating residual data of the selected component by dividing each pixel value of the selected component of the processed low dynamic range image data by a corresponding value of the corresponding component of the high dynamic range image data;
scaling the residual data of the selected component into the range of values comprised between 0 and 1; and
encoding the scaled residual data of the selected component in a residual code stream,
wherein scaling in the range [0,1] of the residual data of the selected component is obtained by subtracting the minimum value of the residual data of the selected component from the residual data of the selected component and then dividing the result of the subtraction by the difference between the maximum and the minimum values of the residual data the of selected component.

2. The method according to claim 1, further comprising the step of gamma correcting the scaled residual data before encoding in the residual code stream, wherein the step of gamma correcting the residual data comprises raising each component of the input scaled residual data to the power of 1/hdr_gamma, wherein hdr_gamma depends upon the values of the high dynamic range image data.

3. The method according to claim 2, wherein hdr_gamma is calculated according to the following formula $$\text{hdr\_gamma} = \frac{\log(\text{min\_value})}{\log(0,5)}$$

wherein $$\text{min\_value} = \frac{1}{\text{max\_HDR}}$$

wherein max_HDR is the maximum pixel value of the input high dynamic range image data.

4. The method according to claim 2, further comprising the step of multiplying, before encoding in the residual code stream, the gamma corrected residual data of the selected component by $2^N-1$ wherein N is the number of bit used to encode the selected component.

5. The method according to claim 1, wherein processing of the low dynamic range image data comprises mapping the values of the pixels of the low dynamic range image data into a range of values from 0 to 1.

6. The method according to claim 1, wherein the low dynamic range image data is obtained by tone mapping the high dynamic range image data and applying a gamma curve to the tone mapped image data, and wherein processing of the low dynamic range image data comprises correcting the low dynamic range image data with a gamma curve which is the inverse of the gamma curve used for obtaining the low dynamic image data from the high dynamic image data.

7. The method according to claim 1, wherein the low dynamic range image data and the high dynamic range image data are represented in different colour spaces, and wherein processing of the low dynamic range image data comprises converting the low dynamic range image data into the colour space of the high dynamic range image data and wherein the residual data are converted into the colour space of the low dynamic range image data before being scaled and gamma corrected.

8. The method according to claim 1, wherein processing of the low dynamic range image data comprises decoding the encoded low dynamic range image data.

9. The method according to claim 1, further comprising the step of exposing the high dynamic range image data before calculating the residual data, and using the exposed high dynamic range image data for calculation of the residual data.

10. The method according to claim 9, wherein exposing the high dynamic range image data comprises multiplying the high dynamic range image data by a scalar value "exposure" calculated according to the following formula:

$$\text{exposure} = \frac{\text{scale\_factor}}{\text{out\_average}}$$

wherein out_average is the average value of all the pixels of the input high dynamic range image data and scale_factor is a scalar value depending on the maximum and minimum values of the high dynamic range image data.

11. The method according to claim 10, wherein scale_factor is computed according to the following formula:

$$\text{scale\_factor} = \log_{10} \frac{\text{HDR\_max}}{(\text{HDR\_min} + 10^{-6})}$$

wherein HDR_max and HDR_min are the maximum and minimum values of the high dynamic range image data.

12. The method according to claim 1, wherein the residual data are set to one if the corresponding low dynamic range image data is equal to zero or if the corresponding high dynamic range image data is equal to or less than zero.

13. The method according to claim 1, wherein encoding of the low dynamic range image data and of the corrected residual data is implemented with the same encoding procedure.

14. A method for processing image data, comprising:
receiving a first code stream comprising low dynamic range image data;
receiving a residual code stream comprising residual data for the reconstruction of high dynamic range image data, the residual code stream comprising the same number of components as the first code stream;
decoding the low dynamic range image data,
range mapping the decoded low dynamic range image data to the range [0,1],
decoding the residual code stream and extracting the residual data;
range mapping the decoded residual data to the range [0,1];
applying a gamma correction to the range mapped decoded residual data using a gamma curve defined by parameters comprised in the first code stream;
scaling each component of the gamma corrected decoded residual data to the range [$\min_c$, $\max_c$] by multiplying each component of the gamma corrected decoded residual data by the difference between $\max_c$ and $\min_c$ and by further adding a shift $\min_c$, wherein $\min_c$, and $\max_c$ are component dependent parameters contained in the first code stream; and
reconstructing the high dynamic range image data using the range mapped low dynamic range image data and the scaled residual data.

15. The method according to claim 14, wherein reconstruction of the high dynamic range image data is obtained by dividing the range mapped low dynamic range image data by the sum of the scaled residual data and an $\varepsilon$ parameter provided in the first code stream.

16. The method according to claim 14, wherein reconstruction of the high dynamic range image data is obtained by
reading an $\varepsilon$ parameter from the first code stream;
calculating a first logarithm of the sum of the scaled residual data and the $\varepsilon$ parameter;
calculating a second logarithm of the sum of the range mapped low dynamic range image data and the $\varepsilon$ parameter;
subtracting the first logarithm from the second logarithm; and
calculating the exponential of the subtraction of the first logarithm from the second logarithm.

17. The method according to claim 14, further comprising the step of gamma correcting the range mapped low dynamic range image data by applying a gamma curve for linearizing the decoded low dynamic range image data.

18. The method according to claim 17, further comprising the step of space converting the range mapped and gamma converted low dynamic range image data before reconstructing the high dynamic range image data.

19. The method according to claim 14, further comprising the step of multiplying or dividing the reconstructed high dynamic range image data by an exposure parameter contained in the first code stream.

20. A method for processing image data, comprising:
providing high dynamic range image data;
providing low dynamic range image data of the high dynamic range image data;
encoding the low dynamic range image data in a first code stream;
processing the low dynamic range image data so as to obtain a processed image;
selecting a component of the high dynamic range image data and a corresponding component of the processed low dynamic range image data;
calculating residual data of the selected component by dividing each pixel value of the selected component of the processed low dynamic range image data by a corresponding value of the corresponding component of the high dynamic range image data;
scaling the residual data of the selected component into the range of values comprised between 0 and 1;
encoding the scaled residual data of the selected component in a residual code stream;
exposing the high dynamic range image data before calculating the residual data and using the exposed high dynamic range image data for calculation of the residual data, wherein exposing the high dynamic range image data comprises multiplying the high dynamic range image data by a scalar value "exposure" calculated according to the following formula:

$$\text{exposure} = \frac{\text{scale\_factor}}{\text{out\_average}}$$

wherein out_average is the average value of all the pixels of the input high dynamic range image data and scale_factor is a scalar value depending on the maximum and minimum values of the high dynamic range image data.

21. The method according to claim 20, wherein scale_factor is computed according to the following formula:

$$\text{scale\_factor} = \log_{10} \frac{\text{HDR\_max}}{(\text{HDR\_min} + 10^{-6})}$$

wherein HDR_max and HDR_min are the maximum and minimum values of the high dynamic range image data.

* * * * *